United States Patent Office 2,712,013
Patented June 28, 1955

2,712,013
CYANINE DYES

Douglas James Fry and Bernard Alan Lea, Ilford, England, assignors to Ilford Limited, Ilford, England, a British company No Drawing. Application February 9, 1953,
Serial No. 335,996

Claims priority, application Great Britain
February 14, 1952

4 Claims. (Cl. 260—240.6)

This invention relates to cyanine dyes which are of value as sensitisers for photographic silver halide emulsions.

According to the present invention there is provided a new class of cyanine dyes of the general formula:

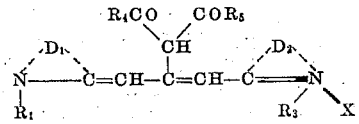

where $R_1$ and $R_3$ are selected from the class consisting of alkyl, aralkyl and aryl groups, $R_4$ and $R_5$ are selected from the class consisting of alkyl, aralkyl, aryl, alkoxy and amino groups and together contain less than 12 carbon atoms, $D_1$ is a residue selected from the class consisting of the residues of thiazole, selenazole, and the corresponding benz- and naphtha-thiazoles and selenazoles, and $D_2$ is a residue selected from the class consisting of the residues of thiazole, selenazole and oxazole and the corresponding benz- and naphtha-thiazoles, selenazoles and oxazoles. The said dyestuffs, and particularly those in which $D_1$ and $D_2$ are the residues of benzthiazole nuclei, $R_1$ and $R_3$ are lower alkyl groups containing up to 4 carbon atoms, and $R_4$ and $R_5$ are selected from methyl, ethyl, methoxy, phenyl and carboxylic ester groups, are valuable sensitisers for photographic silver halide emulsions, imparting to silver iodobromide emulsions, for example, a strong sensitivity in the green and red regions of the spectrum. The present invention includes photographic silver halide emulsions containing the aforesaid dyestuffs in sensitising amount.

According to a further feature of the present invention, the said cyanine dyes are prepared by reacting a cyanine dye of the formula:

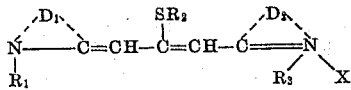

where $R_2$ is an alkyl, aralkyl or aryl group and the other symbols have the meanings assigned to them above, with a β-dicarbonyl compound of the formula $R_4COCH_2COR_5$ where $R_4$ and $R_5$ have the meanings assigned to them above, the reaction being effected by heating the said compounds together in the presence of a base.

Although the reaction takes place with weaker bases such as pyridine, sodium acetate or potassium carbonate, the best yields have been found to accrue when the base used is relatively strong, e. g. sodium ethoxide and triethylamine.

Referring to the symbols used in the foregoing formulae, it is to be understood that where alkyl groups are referred to these may be, for example, methyl, ethyl, propyl, butyl or a higher alkyl group, where aralkyl groups are referred to these may be, for example, benzyl or naphthylmethyl, and where aryl groups are referred to these may be, for example, phenyl or naphthyl. Alkoxy groups may be derived from any of the foregoing alkyl groups, and amino groups may be substituted, e. g. the β-dicarbonyl compound may be acetoacetanilide.

The residues $D_1$ and $D_2$, where they carry benz or naphtha ring systems, may be substituted in the carbocyclic rings with one or more groups such as alkyl, aryl, amino, hydroxy, alkoxy and methylene dioxy groups, or by halogen atoms.

The following examples will serve to illustrate the invention:

EXAMPLE 1

*3-ethyl-3'-methyl-9-(diacetylmethyl)thiacarbocyanine iodide*

Method A.—0.25 gm. 3-ethyl-3'-methyl-9-ethylthiothiacarbocyanine iodide was mixed with 2.5 mls. of acetylacetone and 0.24 ml. of triethylamine. The mixture was heated on a water-bath for 6 hours, diluted with ether and the precipitated dye filtered off and washed with ether. It was crystallised from 40 mls. of ethyl alcohol and obtained as green plates, M. Pt. 280° C. (d).

Method B.—0.2 gm. 3-ethyl-3'-methyl-9-ethylthiothiacarbocyanine iodide was mixed with 2 mls. of acetylacetone and a solution of 0.0087 gm. of sodium in 0.4 ml. of methyl alcohol. After heating on a water-bath for 16 hours a solution of an additional 0.1 gm. of sodium in 2 mls. of methyl alcohol was added and heating continued for another 1½ hours. The solution was diluted with ether and the precipitate filtered off, M. Pt. 280° C. (d).

When this dye was incorporated in a silver iodobromide emulsion the sensitivity was extended to 6500 A with a maximum at 6200 Å.

EXAMPLE 2

*3-ethyl-3'-methyl-9-(acetylcarbethoxymethyl)-thiacarbocyanine iodide*

0.25 gm. 3 - ethyl - 3'-methyl-9-ethylthiothiacarbocyanine iodide was mixed with 2 mls. of ethyl acetoacetate and 0.2 ml. of triethylamine and the mixture heated on a water-bath for 9 hours. Addition of ether precipitated the product which was filtered off and washed with ether. The dye was crystallised from 10 mls. ethyl alcohol and obtained as green crystals, M. Pt. 214–215° C. (d).

When this dye was incorporated in a silver iodobromide emulsion the sensitivity was extended to 6450 A with a maximum at 6100 Å.

EXAMPLE 3

*3 - ethyl-3'-methyl - 9 - (benzoylacetylmethyl)thiacarbocyanine iodide*

0.25 gm. 3-ethyl-3'-methyl-9-ethylthiothiacarbocyanine iodide was mixed with 1 gm. of benzoylacetone and 0.2 ml. of triethylamine and the mixture heated on a water-bath for 6 hours. After dilution with ether, the solid was filtered, dissolved in acetone and re-precipitated with ether. The product was crystallised from 12 mls. ethyl alcohol and obtained as a dark purple powder, M. Pt. 164–167° C.

When this dye was incorporated in a silver iodobromide emulsion the sensitivity was extended to 64 Å with a maximum at 5700 Å.

EXAMPLE 4

*3-ethyl - 3' - methyl-9-(benzoylcarbethoxymethyl)thiacarbocyanine iodide*

A mixture of 0.25 gm. 3-ethyl-3'-methyl-9-ethylthiothiacarbocyanine iodide, 2 mls. of ethyl benzoylacetate and 0.2 ml. of triethylamine was heated on a water-bath for 10 hours. After dilution with ether, the solid was filtered and washed with ether. It was heated with 6 mls. of ethyl alcohol, the solution filtered from some undissolved starting material and the filtrate diluted with ether. The product was precipitated as a dark purple powder, M. Pt. 163° C.

When this dye was incorporated in a silver iodobromide emulsion the sensitivity was extended to 6450 Å with a maximum at 5900 Å.

EXAMPLE 5

3:3' - diethyl-9-(diacetylmethyl)thiacarbocyanine iodide 0.5 gm. 3:3'-diethyl-9-ethylthiothiacarbocyanine iodide was mixed with 4 mls. of acetylacetone and 0.4 ml. of triethylamine. The mixture was heated on a water-bath for 10 hours and then diluted with ether. The precipitated dye was filtered and washed with ether. It was crystallised from 70 mls. of ethyl alcohol and separated as green plates, M. Pt. 277° C. (d).

When this dye was incorporated in a silver iodobromide emulsion the sensitivity was extended to 6350 Å with a maximum at 6200 Å.

EXAMPLE 6

3 - ethyl-3'-methyl - 9 - (dipropionylmethyl)thiacarbocyanine iodide

A mixture of 0.25 gm. 3-ethyl-3'-methyl-9-ethylthiothiacarbocyanine iodide, 2 mls. of dipropionylmethane and 0.2 ml. of triethylamine was heated on a water-bath for 14 hours. After dilution with ether the solid was filtered off and washed with ether. The dye was crystallised from 50 mls. of ethyl alcohol. The solid which first separated was contaminated with starting material, but after concentrating the filtrate the pure product was obtained as green crystals, M. Pt. 266–267° C.

When this dye was incorporated in a silver iodobromide emulsion the sensitivity was extended to 6400 Å with a maximum at 6250 Å.

EXAMPLE 7

3:3' - diethyl - 9 - (acetylcarbethoxymethyl)thiacarbocyanine iodide

A mixture of 0.45 gm. 3:3'-diethyl-9-ethylthiothiacarbocyanine iodide, 4 mls. of ethyl acetoacetate and 0.4 ml. of triethylamine was heated on the water-bath for 7½ hours. After dilution with ether the solid was filtered off and washed with ether. The dye was crystallised from 70 mls. ethyl alcohol and obtained as green crystals, M. Pt. 224° C. (d).

When this dye was incorporated in a silver iodobromide emulsion the sensitivity was extended to 6350 Å with maxima at 5400 Å and 5900 Å.

EXAMPLE 8

3-ethyl - 3' - methyl - 9 - (dicarbethoxymethyl)thiacarbocyanine iodide 0.22 gm. of 3-ethyl-3'-methyl-9-ethylthiothiacarbocyanine iodide was mixed with 2 ml. of diethyl malonate and two equivalents of sodium in methanol (0.0188 gm. sodium in 0.82 ml. methanol). The mixture was heated on the water-bath under reflux for 26½ hours (ethyl mercaptan being evolved), cooled and diluted with ether. The crude product was obtained as green plates, M. Pt. 278° C. (d).

When this dye was incorporated in a silver iodobromide emulsion the sensitivity was extended to 6450 Å with maxima at 5400 Å, 5800 Å and 6100 Å.

EXAMPLE 9

3:3' - dimethyl-9-(dicarbmethoxymethyl)thiacarbocyanine chloride 0.50 gm. 3:3'-dimethyl-9-methylthiothiacarbocyanine bromide was mixed with 3 ml. dimethyl malonate and 0.5 ml. triethylamine. The mixture was heated on the water-bath for 56 hours, methyl mercaptan being evolved. Diluted with ether, filtered and washed with 10 ml. ethyl alcohol to obtain 0.50 gm. green crystals. The crude product was dissolved in 10 ml. of hot m-cresol and heated, with stirring, for ½ hour with 0.3 gm. of freshly prepared silver chloride. The silver halides were then filtered off and the dye was precipitated from the filtrate with ether.

Crystallisation from 100 ml. of ethyl alcohol gave the product as green plates which decomposed without melting at 310° C.

When this dye was incorporated in a silver iodobromide emulsion the sensitivity was extended to 6600 Å with a maximum at 6100 Å.

EXAMPLE 10

3 - ethyl-3'-methyl-9-(acetylcarbanilidomethyl)thiacorbocyanine iodide 0.30 gm. 3-ethyl-3'-methyl-9-ethylthiothiacarbocyanine iodide was mixed with 1.5 gm. of acetoacetanilide and 0.3 ml. of triethylamine and the mixture heated under reflux for 2½ hours on the water-bath, ethyl mercaptan being evolved. The crude melt was extracted by boiling with four 50 ml. portions of petroleum ether (B. Pt. 60–80° C.) and the residue then dissolved in 5 ml. ethyl alcohol and precipitated with 80 ml. of dry ether. After crystallisation from 130 ml. ethyl alcohol the product was obtained as a purple powder, M. Pt. 251° C.

When this dye was incorporated in a silver iodobromide emulsion the sensitivity was extended to 6400 Å with a maximum at 6100 Å.

EXAMPLE 11

3:3'-dimethyl-9-(diacetylmethyl)thiacarbocyanine bromide 0.30 gm. 3:3'-dimethyl-9-ethylthiothiacarbocyanine bromide was mixed with 3 ml. of acetyl acetone and 0.25 ml. of triethylamine. The mixture was heated under reflux for 10½ hours on the water-bath, ethyl mercaptan being evolved. The crude product was isolated by precipitation with ether and dissolved in 50 ml. of methyl alcohol from which a small amount of a mixture of starting material and product crystallised. The filtrate was evaporated to 25 ml. and the product crystallised as green plates, M. Pt. 282° C.

When this dye was incorporated in a silver iodobromide emulsion the sensitivity was extended to 6500 Å with maxima at 5700 Å and 6250 Å.

EXAMPLE 12

3:3'-dimethyl-5-chlor-9-(diacetylmethyl)thiacarbocyanine iodide 0.30 gm. 3:3'-dimethyl-5-chlor-9-ethylthiothiacarbocyanine iodide was mixed with 3 ml. acetyl acetone and 0.3 ml. triethylamine and the mixture heated under reflux on the water-bath for 12 hours. After the addition of an extra 2 ml. of acetyl acetone and 0.25 ml. of triethylamine the heating was continued for another 8 hours. The crude product was isolated by precipitation with ether and recrystallised from 60 ml. of ethyl alcohol. The first crop contained a trace of starting material, but the second crop obtained as green crystals by evaporation of the filtrate to 20 ml. was free of this impurity, M. Pt. 263° C. (d).

When this dye was incorporated in a silver iodobromide emulsion the sensitivity was extended to 6500 Å with maxima at 5700 Å and 6150 Å.

EXAMPLE 13

3-ethyl-3'-methyl-9-(diacetylmethyl)thiacarbocyanine bromide 0.14 gm. of 3-ethyl-3'-methyl-9-phenylthiothiacarbocyanine bromide was mixed with 2 ml. of acetyl acetone and 0.25 ml. of triethylamine and the mixture was heated on the water-bath under reflux for 17 hours. The product (0.11 gm.) was precipitated with ether. After washing with ether and crystallisation from 10 ml. of ethyl alcohol, the product was obtained as green plates, M. Pt. 262° C. (d).

EXAMPLE 14

*3-ethyl-3'-methyl-9-(diacetylmethyl)-4':5'-benzothiacarbocyanine bromide*

0.35 gm. of 3-ethyl-3'-methyl-9-ethylthio-4':5'-benzothiacarbocyanine bromide was mixed with 2.5 ml. of acetyl acetone and 0.35 ml. of triethylamine and heated under reflux on the water-bath for 3½ hours, ethyl mercaptan being evolved. The product (0.18 gm.) was precipitated with 60 ml. of dry ether and obtained as green crystals, M. Pt. 227–228° C. (d) after crystallisation from 20 ml. of ethyl alcohol.

When this dye was incorporated in a silver iodobromide emulsion the sensitivity was extended to 6850 Å with a maximum at 6450 Å.

EXAMPLE 15

*3:3'-diethyl-5-methyl-9-(diacetylmethyl)thiacarbocyananine iodide*

0.40 gm. of 3:3'-diethyl-5-methyl-9-ethylthiothiacarbocyanine iodide was mixed with 2.5 ml. of acetyl acetone and 0.4 ml. of triethylamine and the mixture heated on the water-bath under reflux for 3¼ hours, ethyl mercaptan being evolved. The crude product was precipitated with 75 ml. of dry ether and after crystallising from 40 ml. of ethyl alcohol was obtained as green crystals, M. Pt. 278° C. (d).

When this dye was incorporated in a silver iodobromide emulsion the sensitivity was extended to 6450 Å with maxima at 5500 Å and 6000 Å.

EXAMPLE 16

*3:3'-diethyl-5:5'-dimethyl-9-(diacetylmethyl)thiacarbocyanine iodide*

0.30 gm. of 3:3'-diethyl-5:5'-dimethyl-9-ethylthiothiacarbocyanine iodide was mixed with 1.5 ml. of acetyl acetone and 0.3 ml. of triethylamine and the mixture heated under reflux on the water-bath for 3 hours, ethyl mercaptan being evolved. The product was precipitated with ether and crystallised from 40 ml. of ethyl alcohol to give green plates, M. Pt. 269–270° C. (d).

When this dye was incorporated in a silver iodobromide emulsion the sensitivity was extended to 6400 Å with maxima at 5500 Å and 6000 Å.

EXAMPLE 17

*3:3'-diethyl-5-chlor-9-(diacetylmethyl)thiacarbocyanine iodide*

0.30 gm. of 3:3'-diethyl-5-chlor-9-ethylthiothiacarbocyanine iodide was mixed with 2 ml. of acetyl acetone and 0.3 ml. of triethylamine and the mixture heated under reflux for 4½ hours on the water-bath, ethyl mercaptan being evolved. The product was precipitated with 40 ml. of dry ether and crystallised as green plates, M. Pt. 278–279° C. (d) from 40 ml. of ethyl alcohol.

When this dye was incorporated in a silver iodobromide emulsion the sensitivity was extended to 6400 Å with maxima at 5600 Å and 6100 Å.

EXAMPLE 18

*3-ethyl-3'-methyl-9-(diacetylmethyl)oxathiacarbocyanine iodide*

0.30 gm. of 3-ethyl-3'-methyl-9-ethylthiooxathiacarbocyanine iodide was mixed with 3.5 ml. of acetyl acetone and 0.35 ml. of triethylamine and the mixture heated under reflux on the water-bath for 4½ hours, ethyl mercaptan being evolved. The crude product (0.05 gm.) was precipitated with ether and crystallised at —80° C. as a red powder from 7 ml. of ethyl alcohol, M. Pt. 212° C. (d) with previous softening.

When this dye was incorporated in a silver bromide emulsion the sensitivity was extended to 6200 Å with a maximum at 5700 Å.

EXAMPLE 19

*3:3'-diethyl-9-(diacetylmethyl)thiaselenocarbocyanine iodide*

0.30 gm. of 3:3'-diethyl-9-ethylthiothiaselenocarbocyanine iodide was mixed with 2.5 ml. of acetyl acetone and 0.30 ml. of triethylamine, and the mixture was heated under reflux on the water-bath for 4¼ hours, ethyl mercaptan being evolved. The crude product (0.15 gm.) was precipitated with ether and crystallised from 13 ml. of ethyl alcohol as blue crystals, M. Pt. 256–258° C. (d).

When this dye was incorporated in a silver iodobromide emulsion the sensitivity was extended to 6550 Å with a maximum at 6300 Å.

EXAMPLE 20

*3:3'-diethyl-9-(acetylcarbmethoxymethyl)-thiacarbocyanine iodide*

0.40 gm. of 3:3'-diethyl-9-ethylthiothiacarbocyanine iodide was mixed with 2.5 ml. of methyl acetoacetate and 0.4 ml. of triethylamine and the mixture heated under reflux on the water-bath for 6 hours, ethyl mercaptan being evolved. The product was precipitated with 75 ml. of dry ether and crystallised as green plates, M. Pt. 189–190° C. (d) from 28 ml. of ethyl alcohol.

When this dye was incorporated in a silver iodobromide emulsion the sensitivity was extended to 6500 Å with a maxima at 5400 Å and 6100 Å.

EXAMPLE 21

*3:3'-dimethyl-9-(acetylcarbmethoxymethyl)thiacarbocyanine bromide*

0.40 gm. of 3:3'-dimethyl-9-methylthiothiacarbocyanine bromide was mixed with 2.5 ml. of methyl acetoacetate and 0.4 ml. of triethylamine and the mixture heated under reflux on the water-bath for 27½ hours, methyl mercaptan being evolved. The crude product was precipitated with dry ether and obtained as green crystals when crystallised from 80 ml. of ethyl alcohol, M. Pt. 208° C. (d).

When this dye was incorporated in a silver iodobromide emulsion the sensitivity was extended to 6700 Å with maxima at 5600 Å and 6300 Å.

What we claim is:

1. Cyanine dyes of the general formula:

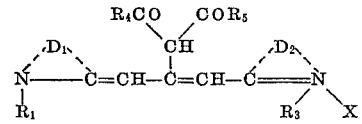

where $R_1$ and $R_3$ are lower alkyl groups, $R_4$ and $R_5$ are selected from the class consisting of alkyl, phenyl, alkoxy and phenylamino groups and together contain less than 12 carbon atoms, $D_1$ is a residue selected from the class consisting of the residues of thiazole, selenazole and the corresponding benz- and naphtha-thiazoles and selenazoles, and $D_2$ is a residue selected from the class consisting of the residues of thiazole, selenazole and oxazole and the corresponding benz- and naphtha-thiazoles, selenazoles and oxazoles.

2. Process for the production of a cyanine dyestuff conforming to the general formula:

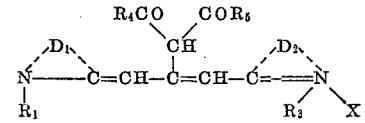

where $R_1$ and $R_3$ are lower alkyl groups, $R_4$ and $R_5$ are selected from the class consisting of alkyl, phenyl, alkoxy and phenylamino groups and together contain less than 12 carbon atoms, $D_1$ is a residue selected from the class consisting of the residues of thiazole, selenazole and the corresponding benz- and naphtha-thiazoles and selenazoles, and $D_2$ is a residue selected from the class consisting of the residues of thiazole, selenazole and oxazole and the corresponding benz- and naphtha-thiazoles, selenazoles and oxazoles, which comprises reacting a cyanine dye of the formula:

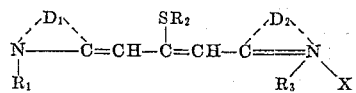

where $R_2$ is selected from the class consisting of alkyl and phenyl groups, with a β-dicarbonyl compound of the formula $R_4COCH_2COR_5$.

3. Process according to claim 2 wherein the reaction is carried out by heating the reagents together in the presence of a base.

4. Process according to claim 2 wherein the reaction is carried out by heating the reagents together in the presence of triethylamine.

References Cited in the file of this patent

UNITED STATES PATENTS

| | | |
|---|---|---|
| 2,304,981 | Wilmanns | Dec. 15, 1942 |
| 2,307,916 | Brooker | June 12, 1943 |
| 2,310,640 | Kendall | Feb. 9, 1943 |
| 2,415,927 | Anish | Feb. 18, 1947 |